United States Patent [19]

Kawagoe et al.

[11] Patent Number: 5,083,275
[45] Date of Patent: Jan. 21, 1992

[54] HEIGHT CONTROL SYSTEM FOR AUTOMOTIVE SUSPENSION SYSTEM WITH VEHICLE DRIVING CONDITION DEPENDENT VARIABLE TARGET HEIGHT

[75] Inventors: Kenji Kawagoe; Hideo Ito; Masatsugu Yokote, all of Kanagawa, Japan

[73] Assignee: Nissan Motor Company, Limited, Yokohama, Japan

[21] Appl. No.: 179,314

[22] Filed: Apr. 8, 1988

[51] Int. Cl.$^5$ .............................................. B60G 21/06
[52] U.S. Cl. .................. 364/424.05; 280/707
[58] Field of Search ............... 364/424.05; 280/840, 280/707, 6.11, 6.12; 180/41

[56] References Cited

U.S. PATENT DOCUMENTS

| | | | |
|---|---|---|---|
| 4,266,790 | 5/1981 | Uemura et al. | 280/6.1 |
| 4,519,169 | 5/1985 | Smith | 51/241 S |
| 4,610,462 | 9/1986 | Kumagai et al. | 280/DIG. 1 |
| 4,659,104 | 4/1987 | Tanaka et al. | 280/707 |
| 4,700,303 | 10/1987 | Tokuyama et al. | 280/DIG. 1 |
| 4,718,695 | 1/1988 | Kawagoe | 280/707 |
| 4,729,580 | 3/1988 | Buma et al. | 280/6.12 |
| 4,809,176 | 2/1989 | Oowa et al. | 280/DIG. 1 |

FOREIGN PATENT DOCUMENTS

| | | |
|---|---|---|
| 0114680 | 8/1984 | European Pat. Off. |
| 0117700 | 8/1984 | European Pat. Off. |
| 3715441 | 11/1987 | Fed. Rep. of Germany |
| 61-263818 | 11/1986 | Japan |
| 62-184911 | 8/1987 | Japan |

Primary Examiner—Parshotam S. Lall
Assistant Examiner—V. Trans
Attorney, Agent, or Firm—Foley & Lardner

[57] ABSTRACT

A height control system utilizing at least first and second mutually different target height ranges for selectively using in vehicular height control. The first target height range is utilized for detecting the height adjustment initiating timing and the second target height range is utilized for detecting the height adjustment terminating timing. The first and second target height ranges are variable depending upon the vehicle driving condition, such as vehicle driving speed, road surface condition and so forth.

50 Claims, 6 Drawing Sheets

HEIGHT CONTROL SYSTEM FOR AUTOMOTIVE SUSPENSION SYSTEM WITH VEHICLE DRIVING CONDITION DEPENDENT VARIABLE TARGET HEIGHT

BACKGROUND OF THE INVENTION

1. Field of the Invention

The present invention relates generally to a height control system for an automotive suspension system for adjusting or regulating vehicular height within a predetermined height range. More specifically, the invention relates to a vehicular height control system which can vary a target height, about which the predetermined height range is defined, so that frequency of height adjustment during vehicular travel on an undulated road.

2. Description of the Background Art

In the recent years, there have been developed various vehicular height control systems for regulating height of a vehicle body relative to road surface and whereby for regulating vehicular attitude. In the typical construction of prior proposed vehicular height control system, vehicular height is monitored by a vehicle height sensor which monitors height of the vehicle body relative to the road surface or to a suspension member rotatably supporting a road wheel. Height adjustment is performed by adjusting suspension force to be exerted between the vehicle body and the suspension member to maintain the vehicular height within a predetermined height range. In practice, the suspension force is generated by means of a pressure chamber which is connected to a pressurized fluid source to introduce thereinto and discharge therefrom a pressurized working fluid, such as air, viscous oil and so forth.

Some of the prior proposed height control systems employs variable target height for varying the vehicle height range toward which the vehicle height is adjusted, depending upon the vehicle driving condition. For example, one of the vehicular height control system employing the variable target height has been disclosed in the Japanese patent First (unexamined) publication (Tokkai) Showa 61-263818. In the disclosed system, two target heights are employed. One of the target height is used for detecting the vehicular height requiring the height adjustment for starting height adjustment. The other target height is used for detecting the timing for termination of the height adjustment.

In the prior proposed height control systems, detects are encountered when the vehicle enters into an undulated road from smooth road for temporarily stopping. Because the undulation of the road surface tends to cause variation of the relative distance between the vehicle body and the road wheel to vary the vehicular height out of the predetermined height range. If vehicle starts to run immediately after temporary stop at the undulated road, height adjustment may not be required despite of the fact that the vehicular height as monitored is out of the predetermined height range. However, the prior proposed height control system is responsive to the vehicular height out of the predetermined height range to perform height adjustment to adapt the vehicular height at the undulated road. This requires another height adjustment when the vehicle starts to run again on the smooth road.

Furthermore, when the vehicle travels on the undulated road repeating temporary stop, height adjustment is too frequency performed to exhaust a compressor as a fluid pressure source and to degrade riding comfort.

SUMMARY OF THE INVENTION

Therefore, it is an object of the present invention to provide a height control system which can solve the drawback in the prior proposed height control systems.

Another object of the invention is to provide a vehicular height control system which can avoid too frequent height control by varying target height depending upon the vehicular driving condition.

In order to accomplish the aforementioned and other objects, a height control system, according to the present invention, utilizing at least first and second mutually different target heights for selectively using in vehicular height control. The first target height is set to be used in the vehicular height control while vehicle is running. On the other hand, the second target height is selected to perform vehicular height control while the vehicle is resting or not running.

According to one aspect of the invention, a height control system for an automotive suspension control system comprises a suspension system disposed between a vehicle body and a suspension member rotatably supporting a road wheel, the suspension system including means for varying suspension force to be exerted between the vehicle body and the suspension member, a first sensor monitoring a vehicular height for producing a height indicative first sensor signal, a second sensor monitoring a vehicular driving condition to produce a vehicular driving condition indicative second sensor signal, and a controlling means for receiving the first sensor signal, and checking the value of the sensor signal with respect to a predetermined target height range indicative values for deriving a control signal to operate the varying means to adjust the suspension force for maintaining the vehicular height within the target height range, the controlling means being defining the target height range in relation to a predetermined target height with a given acceptable height deviation from the target height, which given acceptable deviation is variable depending upon the vehicle driving condition as represented by the second sensor signal.

According to another aspect of the invention, a height control system for an automotive suspension control system comprises a suspension system disposed between a vehicle body and a suspension member rotatably supporting a road wheel, the suspension system including means for varying suspension force to be exerted between the vehicle body and the suspension member, a first sensor monitoring a vehicular height for producing a height indicative first sensor signal, a second sensor monitoring a vehicular driving condition to produce a vehicular driving condition indicative second sensor signal, and a controlling means for receiving the first sensor signal, and checking the value of the sensor signal with respect to predetermined first and second target height range indicative values, the first and second target range indicative values serving as first upper and first lower criteria and second upper and second lower criteria for deriving a control signal to operate the varying means to adjust the suspension force for maintaining the vehicular height within the target height range, the controlling means utilizing the first target height range for detecting height adjustment initiating timing and the second target height range for detecting height adjustment terminating timing, and determining the first and second target height ranges in relation to a predetermined target height with a given first and second acceptable height deviations from the target height, which first and second acceptable deviation is variable depending upon the vehicle driving contion as represented by the second sensor signal.

The controlling means may derive the first upper and first lower criteria and second upper and second lower criteria with setting the predetermined target height as a center value thereof.

The vehicular height control system further comprises a timer means triggered in response to the first sensor signal indicative of the vehicular height out of the first target height range to measure a period of time in which the vehicular height is held out of the first target height range, and the controlling means is responsive to a timer value representative of the measured elapsed time greater than a given value to initiate height adjustment operation. The given period may be variable depending upon the vehicle driving condition as represented by the second sensor signal.

In the preferred arrangement, the first acceptable height deviation is set greater than the second acceptable height deviation.

In practice, the second sensor monitors vehicle speed to produce a vehicle speed indicative second sensor signal and/or a road surface condition to produce a road surface condition indicative second sensor signal. The first acceptable height is variable depending upon the second sensor signal value which represents the vehicle speed and/or the road surface condition. Also, the second sensor may be active during vehicle is stopping to discriminate between temporarily stopping condition and parking condition of the vehicle to produce vehicular stopping condition indicative sensor signal having a value variable depending upon temporarily stopping condition and parking condition of the vehicle. The first acceptable height may further variable depending upon the second sensor signal value indicative of the ignition switch position.

Similarly, the second acceptable height deviation may be variable depending upon the vehicle speed, road surface condition and/or the ignition switch position. Furthermore, the aforementioned given period of time is also variable depending upon the vehicle speed, road surface condition and/or the ignition switch position.

DESCRIPTION OF THE PREFERRED EMBODIMENT

Figure 1:
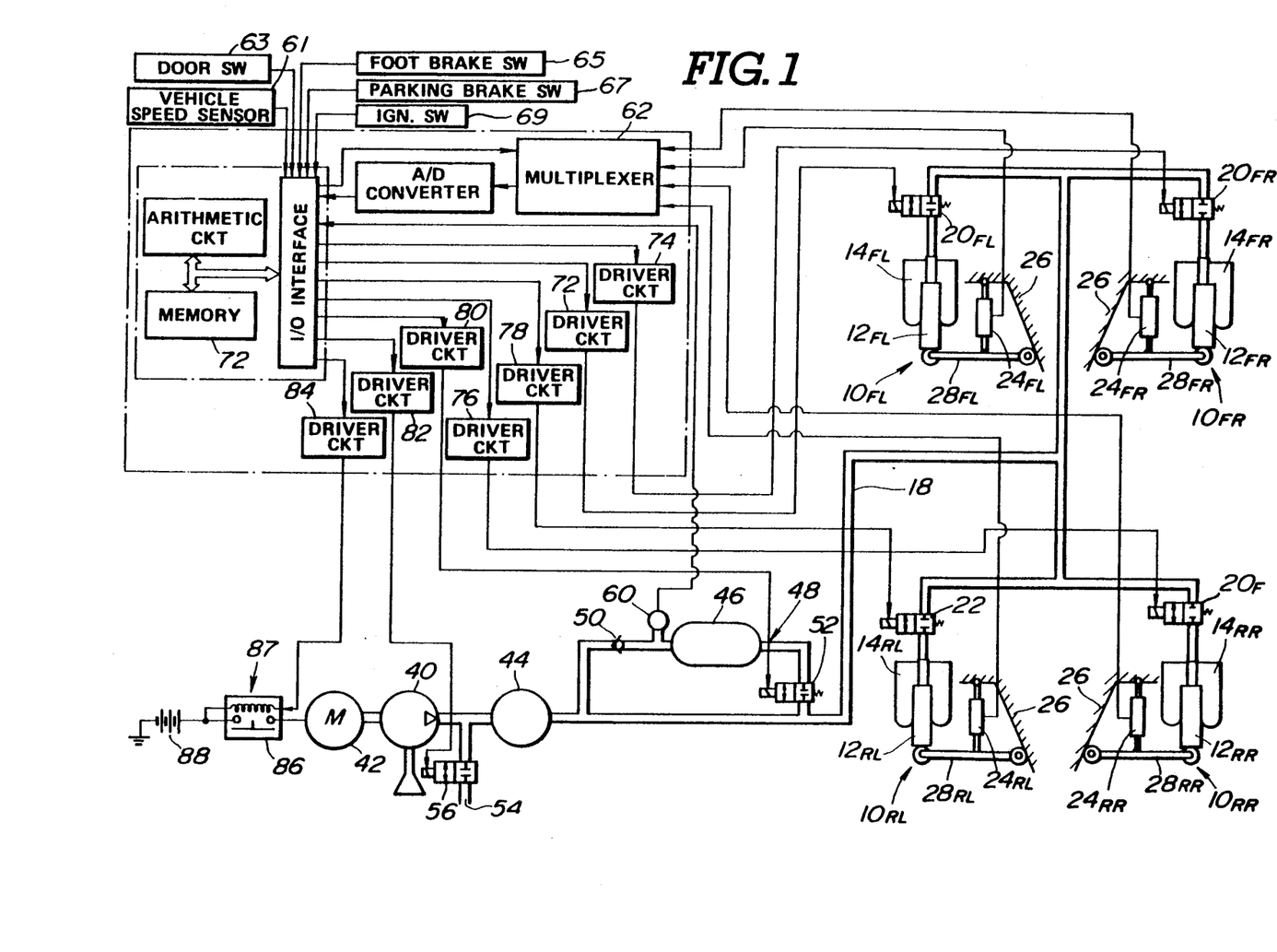
FIG. 1 is a block diagram of the preferred embodiment of a height control system in an automotive suspension system, according to the present invention.

Referring now to the drawings, particularly to FIG. 1, the preferred embodiment of a height control system in an automotive suspension system, according to the present invention, employs suspension system $10_{FL}$, $10_{FR}$, $10_{RL}$ and $10_{RR}$ for rotatably supporting front-left, front-right, rear-left and rear-right vehicular wheels. The suspension systems $10_{FL}$, $10_{FR}$, $10_{RL}$ and $10_{RR}$ include suspension struts $12_{FL}$, $12_{FR}$, $12_{RL}$ and $12_{RR}$ which include shock absorbers and height control actuator means $14_{FL}$, $14_{FR}$, $14_{RL}$ and $14_{RR}$.

The actuator means $14_{FL}$, $14_{FR}$, $14_{RL}$ and $14_{RR}$ generally comprise pressure chambers filled with a working fluid. In the preferred embodiment, the pressure chambers $14_{FL}$, $14_{FR}$, $14_{RL}$ and $14_{RR}$ are filled with gas, such as an air. Each of the pressure chambers $14_{FL}$, $14_{FR}$, $14_{RL}$ and $14_{RR}$ is connected to a pressurized air source 16 via pressure supply system 18. Height control valve means $20_{FL}$, $20_{FR}$, $20_{RL}$ and $20_{RR}$ are disposed within the pressure supply system 18 for controlling air pressure to be supplied for respectively corresponding pressure chambers $14_{FL}$, $14_{FR}$, $14_{RL}$ and $14_{RR}$. As seen from FIG. 1, the height control valve means $20_R$ is designed for commonly adjusting the air pressure in the pressure chambers $14_{RL}$, $14_{RR}$ of the rear suspension systems $10_{RL}$ and $10_{RR}$.

Height sensors $24_{FL}$, $24_{FR}$, $24_{RL}$ and $24_{RR}$ are provided at positions where the respective front-left, front-right, rear-left and rear-right suspension systems $10_{FL}$, $10_{FR}$, $10_{RL}$ and $10_{RR}$ are provided for monitoring relative height between vehicle body 26 and suspension members $28_{FL}$, $28_{FR}$, $28_{RL}$ and $28_{RR}$ (shown in FIG. 2) which are connected to the vehicular wheels. Respective height sensors $24_{FL}$, $24_{FR}$, $24_{RL}$ and $24_{RR}$ produces vehicle height indicative signals $S_{FL}$, $S_{FR}$, $S_{RL}$ and $S_{RR}$. $S_{RR}$ of the height sensors $24_{FL}$, $24_{FR}$, $24_{RL}$ and $24_{RR}$ are fed to a controller 30.

The controller 30 includes a discriminator stage and a control signal generator stage. The vehicle height indicative signals $S_{FL}$, $S_{FR}$, $S_{RL}$ and $S_{RR}$ are input to the discriminator stage of the controller. In the discriminator stage, each of the vehicle height indicative signals $S_{FL}$, $S_{FR}$, $S_{RL}$ and $S_{RR}$ is compared with a maximum height indicative upper criterion $H_U$ and a minimum height indicative lower criterion $H_L$ to discriminate whether the vehicle height as represented by the corresponding vehicle height indicative signal is within a target height range defined by the upper and lower criteria $H_U$ and $H_L$.

When the vehicle height level out of the target height range, the control signal generator stage is triggered for operation. In response to initiation of the operation of the control signal generator stage, a communication valve control signal is, at first, output to the communication valve 22 to open the latter. In response to the height control signal of the control signal generator stage, respective height control valve means $20_{FL}$, $20_{FR}$, $20_{RL}$ and $20_{RR}$ are operated to adjust the vehicle height level at respectively corresponding wheel positions to be within the target height range.

As shown in FIG. 1, the air source 16 comprises a compressed air supply network including a motor driven compressor 40 which is associated with an electric motor 42 to be driven by the driving force transmitted therefrom. The compressor 40 is connected to the pressure supply passage system 18. An air dryer 44 is disposed in the pressure supply passage system 18 and downstream of the compressor for drying the air fed from the compressor. In addition, a pressure accumulator 46 is provided in a pressure accumulation system 48 which is in communication with the pressure supply passage system 18 at both ends. An one-way check valve 50 is provided in the pressure accumulation system 48 and upstream of the pressure accumulator 46. An electromagnetically actuated pressure accumulation control valve 52 is provided downstream of the pressure accumulator 46.

The pressure supply passage system 18 includes a ventilation port 54, at which a ventilation control valve 56 is provided for opening and closing the port.

As seen from FIG. 1, the height control valves means $20_{FL}$, $20_{FR}$, $20_{RL}$ and $20_{RR}$ comprise electromagnetically actuated valves. The height control valves $20_{FL}$, $20_{FR}$, $20_{RL}$ and $20_{RR}$, the pressure accumulation control valve 52 and the ventilation control valve 56 are respectively connected to the controller 30 to be controlled respective valve positions. The height control valves $20_{FL}$, $20_{FR}$, $20_{RL}$ and $20_{RR}$, employed in the shown embodiment, are so designed as to open while they are activated, to establish communication between the pressure chambers $14_{FL}$, $14_{FR}$, $14_{RL}$ and $14_{RR}$ and the pressure supply passage system 16 and to close while they are deactivated, to block the communication. The accumulation control valve 52 is so designed as to be activated to open for establishing communication between the pressure accumulator 46 and the pressure supply passage means 16 and to be deactivated to close for blocking the communication. The ventilation control valve 56 is designed to be activated to open the valve for exposing the pressure supply passage means 16 to the atmosphere for ventilation of the pressurized air through the ventilation port 54 and to be deactivated to shut the valve.

In order to monitor the pressure accumulated on the pressure accumulator 46, a pressure sensor 60 is provided. The pressure sensor 60 is designed for generating an accumulated pressure indicative signal to be input to the controller 30 as a compressor control parameter.

The height sensors $24_{FL}$, $24_{FR}$, $24_{RL}$ and $24_{RR}$, employed in the shown embodiment, comprise stroke sensors disposed between the vehicle body 26 and the suspension members $28_{FL}$, $28_{FR}$, $28_{RL}$ and $28_{RR}$. Each of the stroke sensors $24_{FL}$, $24_{FR}$, $24_{RL}$ and $24_{RR}$ may comprise an electrostatic capacity-type stroke sensor as shown in FIGS. 2 and 3, for example.

Figure 2:
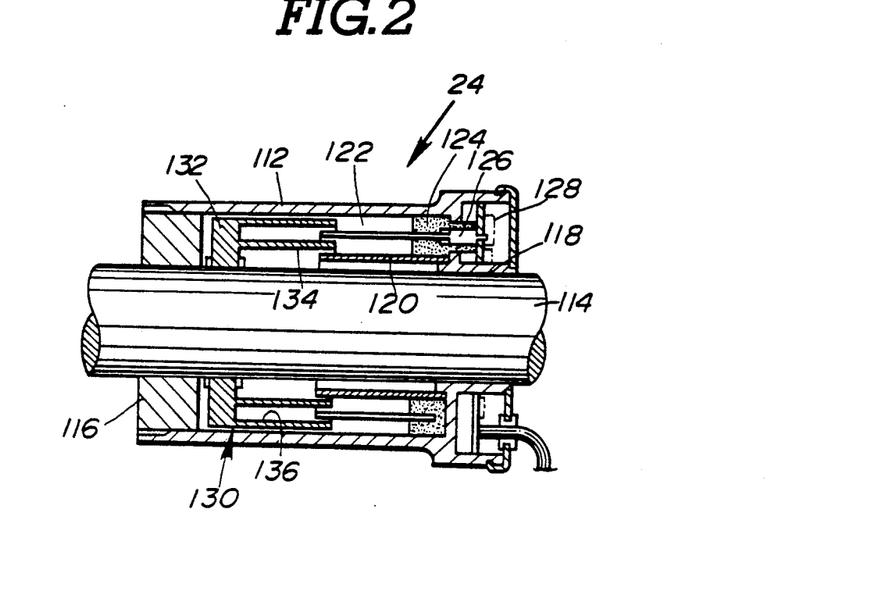
FIG. 2 is a partial and longitudinal section of one example of a vehicle height sensor to be employed in the preferred embodiment of the vehicle height control system according to the invention.
Figure 3:
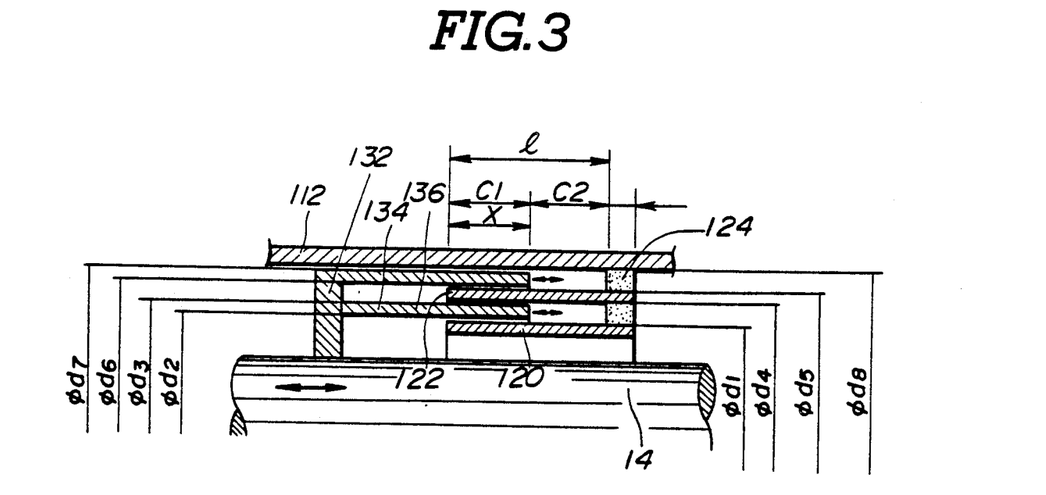
FIG. 3 is an enlarged section of the major part of the vehicle height sensor of FIG. 2.

As shown in FIGS. 2 and 3, the preferred example of the electrostatic capacity-type stroke sensor is generally represented by the reference numeral '110'. The electrostatic capacity-type stroke sensor 110 is designed for measuring relative stroke between a cylindrical member 112 and a rod member 114. In the shown construction, the rod member 114 is coaxially arranged through the cylindrical member 112 and thrustingly supported by means of supporting plug 116 and a cylindrical support section 118 integrally formed with the cylindrical member.

Both of the cylindrical member 112 and the rod member 114 are made of electrically conductive material and, in turn, electrically isolated to each other.

Inner and outer cylinders 120 and 122 are coaxially disposed between the cylindrical member 112 and the rod member 114. The cylindrical member 112, the outer cylinder 122, the inner cylinder 120 and the rod member 114 are coaxially arranged in spaced apart relationship and held in place by means of an annular support 124 which is made of an electrically insulative material.

The inner cylinder 120 is electrically connected to the cylindrical member 112 to constitute therewith a grounding electrode. On the other hand, the outer cylinder 122 is connected to a terminal 126 which is, in turn, connected to a sensor circuit 128. In the shown embodiment, the sensor circuit 128 comprises a RC oscillator. The outer cylinder 122 is designed to function as positive electrode. The sensor circuit 128 is also connected to the grounding electrode formed by the inner cylinder 120 and the cylindrical member 112 to be grounded therethrough.

With the plug 116, the cylindrical supporting section and the insulative support 124 establishes gas tight seal. A gaseous state dielectric material which has stable dielectric constant is filled in the enclosed space.

On the other hand, a dielectric member 130 is provided for movement with the rod member 114. The dielectric member comprises a radially extending disk-shaped section 132 and coaxially arranged inner and outer cylindrical sections 134 and 136. The inner diameter $\phi d_2$ of the inner cylindrical section 134 of the dielectric member 130 is greater than the outer diameter $\phi d_1$ of the inner cylinder 120 and the outer diameter $\phi d_3$ is smaller than the inner diameter $\phi d_4$ of the outer cylinder 122 so that the inner cylindrical section 134 may enter into the annular space defined between the inner and outer cylinders 120 and 122, as shown in FIG. 2. On the other hand, the inner diameter $\phi d_6$ of the outer cylindrical section 136 is greater than the outer diameter $\phi d_5$ of the outer cylinder 122 and the outer diameter $\phi d_7$ is smaller than the inner diameter $\phi d_8$ of the cylindrical member 112 so that the outer cylindrical section may enter into the annular space defined between the outer cylinder 122 and the cylindrical member. On the other hand, the disk-shaped section 132 is rigidly fixed to the outer periphery of the rod member 114 so that the dielectric member 130 may be moved according to movement of the rod member 114.

With the construction set forth above, the electrostatic capacity Ct is created between the inner and outer cylinders 120 and 122 and the inner and outer cylindrical sections 134 and 136 of the dielectric member 130 while relative displacement between the cylindrical member 112 and the rod member 114 occurs.

Here, assuming the possible maximum relative stroke between the cylindrical member 112 and the rod member 114 is as X, shown in FIG. 2, the relative dielectric constant of the dielectric member is $e_2$; and the relative dielectric constant of the gaseous dielectric material is e. It is further assumed that the electrostatic capacity of overlapping portion between the inner and outer cylindrical sections 134 and 136 and the inner and outer cylinders 120 and 122 is $C_1$; the electrostatic capacity of the portions of the inner and outer cylinders 120 and 122 outside of the inner and outer cylindrical sections 134 and 136 is $C_2$; and the electrostatic capacity of the portion where the inner and outer cylinders 120 and 122 are supported is $C_3$. In this case, the electrostatic capacities $C_t$, $C_1$ and $C_2$ can be respectively illustrated by the following equations:

$$C_t = C_1 + C_2 + C_3 \quad (1)$$

$$C_1 + 2\,e_0 x\,[1/\{(1/e_2 - 1/e_1)\ln\cdot d_3/d_2 + 1/e_1\cdot \ln d_4/d_1\} + \{1/(1/e_2 - 1/e_1)\ln\cdot d_7/d_6 + 1/e_1\cdot \ln d_8/d_5\}] \quad (2)$$

$$C_2 = 2 e_0(l-x) \cdot [1/\{(l-e_1)ln(d_4/d_1)\} + 1/\{(l-e_1)ln(d_8/d_5)\}] \quad (3)$$

where $e_0$ is dielectric constant in vacuum
Here, it is assumed:

$$[1/\{(l/e_2 - l/e_1)ln \cdot d_3/d_2 + l/e_1 \cdot ln d_4/d_1\} + \{1/(l/e_2 - l/e_1)ln \cdot d_7 d_6 + l/e_1 \cdot ln d_8/d_5\}] = A; \text{ and}$$

$$[1/\{(l-e_1)ln(d_4/d_1)\} + 1/\{(l-e_1)ln(d_8/d_5)\}] = B$$

A and B are both constant. The equations (2) and (3) can be modified utilizing A and B, the electrostatic constant Ct can be illustrated by:

$$C_t = 2 e_0 x(A - B) + 2 e_0 lB + C_3 \quad (4)$$

As will be appreciated herefrom, the electrostatic constant Ct is variable in proportion to the stroke x.

As set forth, the detector circuit comprises the RC oscillator whose oscillation cycle period can be described by:

$$T = (1/K)RC \quad (5)$$

where K is constant. From this the frequency output characteristics of the RC oscillator can be described by:

$$T = (R/K)2 \, e_0 x(A - B) + C_0 \quad (6)$$

where $C_0 = 2 \, e_0 lB + C_3$

As will be appreciated from the foregoing equations, the frequency oscillation cycle period T is proportional to the relative displacement stroke x. Therefore, by monitoring the frequency oscillation cycle period T, the stroke x can be detected.

Here, the diameters $\phi d_1$ through $\phi d_8$ can be varied depending upon the temperature of atmosphere due to thermal expansion. Among those variable dimensions, the radios $\phi d_3/\phi d_2$ and $\phi d_7/\phi d_6$ are regarded constant despite of various rate of thermal expansions. Similarly, the radios $\phi d_4/\phi d_1$ and $\phi d_8/\phi d_5$ are regarded constant.

On the other hand, the dielectric constants $e_1$ and $e_2$ of the gaseous dielectric material filled in the space defined in the cylindrical member and the dielectric member 130 can be made substantially in constant at any temperature range by appropriately selecting the materials. For example, the dielectric material which exhibits stable dielectric constant in relation to temperature variation may be selected among air or resin, such as polyacetal resin, polypropylene resin. Therefore, as the gaseous dielectric material, the air may be used in the preferred embodiment so as to avoid influence of the temperature variation and to obtain stable dielectric constant thereof.

However, as the dielectric material for forming the dielectric member 130, a material which can provide higher resolution in measurement of the relative stroke between the rod member and the cylindrical member, is preferred. In order to obtain higher resolution, greater electrostatic capacity to be established becomes necessary. This, in turn, requires higher dielectric constant of the dielectric material forming the dielectric member 130. Satisfactorily high dielectric constant is obtainable by utilizing inorganic material, such as mica. Such inorganic material is known to have substantially high dielectric constant but is know as expensive material and as difficult material for machining and/or mass-production. On the other hand, synthetic resins are less expensive and easy for forming a desired shape. However, the synthetic resin generally have low or insufficient dielectric constant as required for the stroke sensor of the type disclosed hereabove.

In this view, the preferred embodiment of the stroke sensor, according to the present invention, employs a composite dielectric material which is a composition of the synthetic resin material and inorganic material. As a resin material to form the composition, thermoplastic resin, such as polypropylene, polyacetal, polybuthylene terephtalate, polyphenylene sulfide and so forth are preferred in view of solubility with the inorganic material. As inorganic material, ceramics are used.

Each of the stroke sensors $24_{FL}$, $24_{FR}$, $24_{RL}$ and $24_{RR}$ are connected to the controller 30 via a multiplexer 62 and an analog-to-digital (A/D) converter 64. On the other hand, the controller 30 comprises a microprocessor 66 having an input/output interface 68, an arithmetic circuit 70, such as CPU, and a memory 72, such as ROM, RAM, register and so forth. The input/output interface 68 is connected to the A/D converter to receive one of the height indicative signal from the corresponding one of the stroke sensors $24_{FL}$, $24_{FR}$, $24_{RL}$ and $24_{RR}$ as selected by the multiplexer 62. The multiplexer 62, is designed to receive a clock signal output from the microprocessor to select one of the height indicative signals in a given order and at a given timing.

The input/output interface 68 is also connected to driver circuits 72, 74, 76, 78, 80, 82, to feed thereto control signals. The driver circuits, 72, 74, 76 and 78 are respectively connected to the height control valves $20_{FL}$, $20_{FR}$, $20_{RL}$ and $20_{RR}$ to feed thereto height control driver signals. The driver circuits 72, 74, 76 and 78 output HIGH level height control driver signals when the height level of respectively corresponding vehicle body portions is out of the target height range and, otherwise, output LOW level height control driver signals. Therefore, the height control valves $20_{FL}$, $20_{FR}$, $20_{RL}$ and $20_{RR}$ are responsive to the HIGH level height control signal to be activated and to the LOW level height control signal to be deactivated. Furthermore, the driver circuit 80 is connected to the pressure accumulation control valve 52 to feed a HIGH level accumulator control signal to open the latter for establishing communication between the pressure accumulator 46 and the pressure supply system 18 and to feed a LOW level accumulator control signal to close the latter for blocking the communication.

The driver circuit 82 is connected to the ventilation control valve 56 to open in order to expose the pressure supply system 18 to the atmosphere by HIGH level ventilation control signal and to shut for closing the pressure supply system.

In addition, the microprocessor 66 detects the pressure in the pressure accumulator 46 dropping lower than a predetermined pressure to generate a compressor control signal. The compressor control signal is fed to a driver circuit 84 via the input/output interface 68. The driver circuit 84 is connected to a power supply control relay 86 which establishes and blocks electric connection between the electric motor 42 and a vehicular battery 88. In response to the compressor control signal, the driver circuit 84 produces a compressor drive signal for energizing the power supply control relay 86 for establishing electric connection between the battery 88 and the motor 42 to drive the motor. As a result, the compressor 40 is driven by the driving force of the motor 42 to supply the pressure to the pressure accumulator 46.

Furthermore, the microprocessor 66 is connected to a vehicle speed sensor 61, a vehicular door switch 63, a foot brake switch 65, a parking brake switch 67 and an ignition switch 69. The vehicle speed sensor 61 monitors vehicular travelling speed to produce a vehicle speed indicative signal. The vehicle door switch 63 is designed to detect open and close of a vehicular door to produce a HIGH level door position indicative signal when the door is in open position and to produce a LOW level door position indicative signal when the door is in closed position. The foot brake switch 63 is designed to detect a foot brake position to produce a LOW level foot brake position indicative signal while the a brake is not applied and to produce a HIGH level foot brake position indicative signal when the foot brake is applied. The parking brake switch 65 is designed to output a parking brake position indicative signal while is held LOW level while the parking brake is in released condition and is switched into HIGH level when the parking brake is applied. On the other hand, the ignition switch is variable of the switch position between various switch positions e.g. LOCK position in which steering lock device is active to lock a vehicular steering, OFF position where electric power supply is shut, ACC position in which electric power is supplied to electric equipments in the vehicle but is not supplied to an ignition system, IGN position in which the electric power is supplied not only to the electric equipments but also to the ignition system, and START position in which the electric power is supplied to the ignition system and a starter motor and is not supplied to the electric equipments. However, in order to simplify the following discussion, any ignition switch position in which power supply for the microprocessor 66 is established will be referred to as "ON" position and any ignition switch position in which power supply for the microprocessor 66 is blocked will be referred to as "OFF" position.

In the shown embodiment of the vehicular height control system, two target height ranges are employed, which target height ranges are substantially the same as that discussed in the aforementioned Japanese Patent First Publication 61-263818. Namely, one of the target height range is used for detecting the height adjustment start timing and thus will be hereafter referred to as "adjustment starting height range". The other target height range is used for detecting the height adjustment terminating timing and thus hereafter referred to as "adjustment terminating height range". The adjustment starting height range is defined by "upper and lower adjustment starting criteria $HU_{start}$ and $HL_{start}$". Similarly, the adjustment terminating height range is defined by "upper and lower adjustment terminating criteria $HU_{end}$ and $HL_{end}$". The upper and lower adjustment starting criteria $HU_{start}$ are determined in relation to a predetermined target height $H_{target}$ which forms the center value of the adjustment starting height range with an acceptable height difference DB. On the other hand, the upper and lower adjustment terminating criteria $HU_{end}$ and $HL_{end}$ are determined in relation to the predetermined target height $H_{target}$ with an acceptable height difference SB. The acceptable height differences DB and SB are variable depending upon the vehicle driving conditions.

Figure 4:
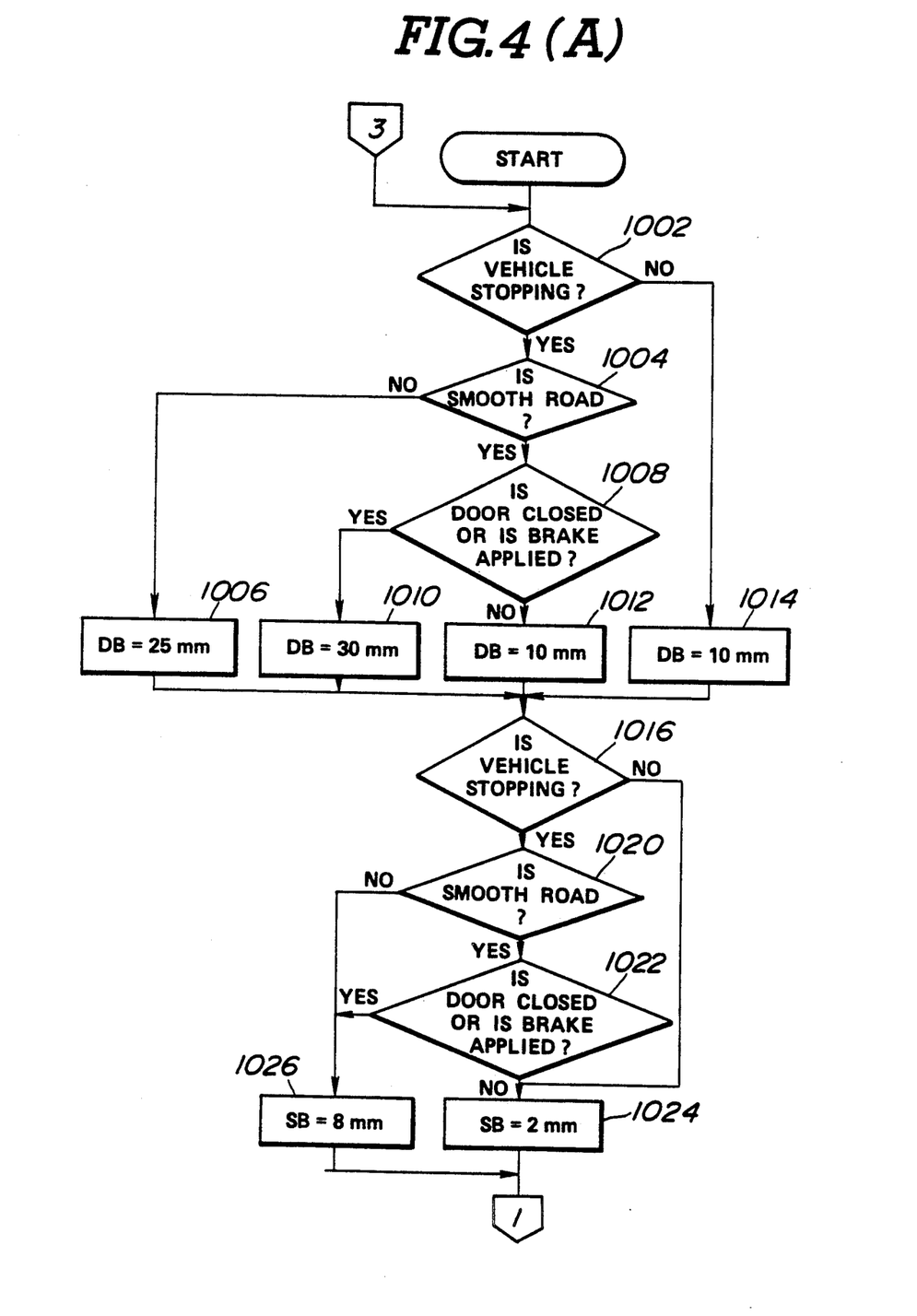
FIGS. 4(A), 4(B) and 4(C) are series of flowchart showing a sequence of a vehicle height control program for controlling height position of a vehicle body relative to a suspension member.

Practical height control operation to be performed by the preferred embodiment of the vehicular height control system according to the invention will be discussed herebelow with reference to FIGS. 4(A), 4(B) and 4(C) which shows a series of height control program to be executed every given timing, e.g. every 20 ms.

At a step 1002 immediately after start execution of the height control program, the vehicle speed indicative signal is checked whether the vehicle speed is zero. When the vehicle speed indicative signal indicates the vehicle speed zero as checked at the step 1002, road surface condition is checked whether the road surface is smooth or not, at a step 1004. In practice, the road surface condition is discriminated on the basis of the vehicle height indicative signal value. Practical process of discrimination of the road surface condition has been discussed in the Japanese Patent First publication No. 62-184911.

When the undulation on the road surface is detected at the step 1004, the acceptable height difference DB for determining the upper and lower adjustment criteria $HU_{start}$ and $HL_{start}$ is set at a value of 25 mm, at a step 1006.

On the other hand, when the road surface condition as checked at the step 1004 is smooth, check is performed whether the door position indicative signal is LOW and one of the foot brake position indicative signal and the parking brake position indicative signal is HIGH or not, at a step 1008. When all of the door position indicative signal is LOW, it represents that the vehicular door is closed. On the other hand, when one of the foot brake position indicative signal and the parking brake position indicative signal is HIGH, it represents that the vehicular brake is applied. At this condition, the acceptable difference DB is set at a value of 30 mm, at a step 1010. When the door position indicative signal is HIGH or both of the foot and parking brake position indicative signals are LOW as checked at the step 1008, the acceptable difference DB is set at a value of 10 mm, at a step 1012. On the other hand, when the vehicle speed as checked at the step 1002 is not zero, the acceptable difference DB is set at a value of 10 mm, at a step 1014.

After one of the steps 1006, 1010, 1012 or 1014, the vehicle speed indicative signal value is again checked at a step 1016. When the vehicle speed indicative signal is zero as checked at the step 1016, the road surface condition is again checked at a step 1020. If the road surface condition is smooth as checked at the step 1020, the foot and paring brake position indicative signals are checked at a step 1022. When neither of the foot and parking brake position indicative signals are LOW as checked at the step 1022, or when the vehicle speed indicative signal as checked at the step 1016 is not zero, the acceptable height difference SB for the upper and lower adjustment terminating criteria $HU_{end}$ and $HL_{end}$ is set at a value of 2 mm, at a step 1024. On the other hand, when the road surface is undulated as checked at the step 1020 or one of the foot and parking brake position indicative signals is HIGH as checked at the step 1022, the acceptable height difference SB is set at a value of 8 mm, at a step 1026.

After the step 1024 or 1026, the ignition switch position indicative signal which is LOW to represent the ignition switch at OFF position and LOW to represent the OFF position, at a step 1028. If OFF position of the ignition switch is detected at the step 1028, an ignition switch ON-set flag $FL_{IGN}$ is reset at a step 1030. Then, a discrimination delay time value Ts which represents a period of time to perform height adjustment therewithin for adjusting the vehicular height in UP and DOWN direction, is set at a value of 45 sec., at a step 1032.

On the other hand, when the ignition switch position indicative signal is HIGH as checked at the step 1028, the ignition switch ON-set flag $FL_{IGN}$ is checked at a step 1034. If the ignition switch ON-set flag $FL_{IGN}$ is not set as checked at the step 1034, the flag $FL_{IGN}$ is set at a step 1036. Thereafter, the discrimination delay time value Ts is set at a value of 0 sec., at a step 1038. On the other hand, when the ignition switch ON-set flag $FL_{IGN}$ is set as checked at the step 1034, the vehicle speed indicative signal value is checked at a step 1040. When the vehicle speed indicative signal value is not zero as checked at the step 1040, the discrimination delay time value Ts is set at a value of 20 sec, at a step 1042. When the vehicle speed indicative signal value as checked at the step 1040 is zero, the door position indicative signal is checked at a step 1044. If the door position indicative signal is LOW as checked at the step 1044, the discrimination delay time value Ts is set at a value of 10 sec, at a step 1046. On the other hand, when the door position indicative signal is HIGH as checked at the step 1044, the discrimination delay time value Ts is set at a value of 2 sec., at a step 1048.

After one of the steps 1032, 1036, 1042, 1046 and 1048, the upper and lower adjustment criteria $HU_{start}$ and $HL_{start}$ are calculated by the following equations, at a step 1050:

$$HU_{start} = H_{target} + DB$$

$$HL_{start} = H_{target} - DB$$

At a step 1052, the upper and lower adjustment criteria $HU_{end}$ and $HL_{end}$ are calculated by the following equations:

$$HU_{end} = H_{target} + SB$$

$$HL_{end} = H_{target} - SB$$

The upper and lower adjustment criteria $HU_{start}$ and $HL_{start}$ and the upper and lower adjustment criteria $HU_{end}$ and $HL_{end}$ are set in the memory 72.

At a step 1054, the vehicle height indicative signal value h is read out. Then, a height adjustment flag $FL_{ADJUST}$ is checked at a step 1056. If the height adjustment flag $FL_{ADJUST}$ is not set as checked at the step 1056, the vehicle height indicative signal value h is compared with the upper adjustment criterion $HU_{start}$, at a step 1058. When the vehicle height indicative signal value h is greater than the upper adjustment criterion $HU_{start}$ as checked at the step 1058, a value $t_{UP}$ of an UP-timer (not shown) in the microprocessor 66 is reset to zero, at a step 1060. Thereafter, a value $t_{DOWN}$ of a DOWN-timer (not shown) in the microprocessor 66 is incremented by a value $t_{cycle}$ corresponding to updating interval, at a step 1062. Then, the DOWN-timer value $t_{DOWN}$ is compared with the discrimination delay time value Ts, at a step 1064. If the DOWN-timer value $t_{DOWN}$ is smaller than the discrimination delay time value Ts as checked at the step 1064, process returns to the step 1002. On the other hand, when the DOWN-timer value $t_{DOWN}$ is held greater than or equal to the discrimination delay time value Ts, the height adjustment flag $FL_{ADJUST}$ is set at a step 1066. Then, downward height adjustment is performed at a step 1068.

In the practical operation of the downward height adjustment, DOWN command is produced. The microprocessor 66 is responsive to this DOWN command to output control signal to the ventilation control signal to open the ventilation control valve 56 to operate the latter into open position. Also, control signal is fed to one of the height control valves $20_{FL}$, $20_{FR}$, $20_{RL}$ and $20_{RR}$ to open to reduce the fluid pressure in corresponding one of the pressure chambers $14_{FL}$, $14_{FR}$, $14_{RL}$ and $14_{RR}$. Therefore, the fluid pressure in the corresponding one of pressure chamber $14_{FL}$, $14_{FR}$, $14_{RL}$ and $14_{RR}$ is reduced to reduce the suspension force to support the vehicle body on the suspension member. Therefore, the vehicle body height relative to the suspension member is lowered.

Thereafter, downward adjustment of the vehicular height, check is performed whether height adjustment is completed or not, at a step 1070. The microprocessor 66 may discriminates height adjustment operation precedingly performed and checkes whether height adjustment is completed in relation to the precedingly performed height adjustment operation. Namely, in case that the step 1070 is carried out after the step 1068, the height indicative signal value is again checked against the upper adjustment criterion $HU_{start}$. When completion of the height adjustment is detected at the step 1070, process goes END and otherwise, returns to the step 1002.

On the other hand, when the vehicular height indicative signal value h is smaller than or equal to the upper adjustment start criterion $HU_{start}$, the height indicative signal value h is compared with the lower adjustment start criterion $HL_{start}$, at a step 1072. When the vehicle height indicative signal value h is smaller than the lower adjustment criterion $HL_{start}$ as checked at the step 1072, the value $t_{DOWN}$ of the DOWN-timer in the microprocessor 66 is reset to zero at a step 1074. Thereafter, the value $t_{UP}$ of the UP-timer in the microprocessor 66 is incremented by a value $t_{cycle}$ corresponding to updating interval, at a step 1076. Then, the UP-timer value $t_{Up}$ is compared with the discrimination delay time value Ts, at a step 1078. If the Up-timer value $t_{Up}$ is smaller than the discrimination delay time value Ts as checked at the step 1078, process returns to the step 1002. On the other hand, when the Up-timer value $t_{Up}$ is held greater than or equal to the discrimination delay time value Ts, the height adjustment flag $FL_{ADJUST}$ is set at a step 1080. Then, upward height adjustment is performed at a step 1082.

In the practical process of the upward height adjustment operation, UP command is issued in response to detection of the DOWN-timer value $t_{DOWN}$ greater than the discrimination delay time value Ts and in response to the vehicular height indicative signal value h smaller than the lower adjustment start criterion $HL_{start}$. The microprocessor 66 is then responsive to the UP command to check the pressure in the pressure accumulator 46. When the pressure in the pressure accumulator 46 is sufficiently high to increase the pressure in the corresponding one of pressure chambers $14_{FL}$, $14_{FR}$, $14_{RL}$ and $14_{RR}$, the control signal is fed to the accumulation control valve 52 to open. On the other hand, when the fluid pressure in the pressure accumulator 46 is not sufficient, the microprocessor 66 outputs HIGH level control signal to the relay 86 to drive the pump motor 42 to drive compressor 40. Simultaneously, HIGH level control signals are fed to corresponding one of the height control valves $20_{FL}$, $20_{FR}$, $20_{RL}$ and $20_{RR}$. By this, the fluid pressure in the corresponding one of the pressure chambers $14_{FL}$, $14_{FR}$, $14_{RL}$ and $14_{RR}$ is increased to increase the suspension force supporting the vehicle body on the suspension member. Consequently, the vehicle body height relative to the suspension member is raised. Thereafter, downward adjustment of the vehicular height, check is performed whether height adjustment is completed or not, at a step 1070. When completion of the height adjustment is detected at the step 1070, process goes END and otherwise, returns to the step 1002.

When the height indicative signal value h is greater than or equal to the lower adjustment start criterion $HL_{start}$ as checked at the step 1072, which means that the vehicular height is within the adjustment start target height range. Therefore, the UP-timer value $t_{UP}$ and the DOWN-timer value $T_{DOWN}$ are reset at a step 1084. Thereafter process goes to the step 1070 to check whether height adjustment is completed.

On the other hand, when the height adjustment flag $FL_{ADJUST}$ is set as checked at the step 1056, process goes to a step 1086, in which the vehicular height indicative signal value h is compared with the upper adjustment terminating criterion $HU_{end}$. When the vehicular height indicative signal value h is greater than the upper adjustment terminating criterion $HU_{end}$ as checked at the step 1086, downward height adjustment is performed at a step 1088. Thereafter, process goes to the step 1070 to check whether the height adjustment is completed or not. When the vehicular height indicative signal value h is smaller than or equal to the upper height adjustment terminating criterion $HU_{end}$, the height indicative signal value h is then compared with the lower adjustment terminating criterion $HL_{end}$ at a step 1090. If the height indicative signal value h is smaller than the lower adjustment terminating criterion $HL_{end}$, upward height adjustment is performed at a step 1092. After the step 1092 or when the height indicative signal value h is greater than or equal to the lower adjustment terminating criterion $HL_{end}$ which means that the vehicular height is within the height adjustment terminating target height range, the height adjustment flag $FL_{ADJUST}$ is reset at a step 1094. Then, the process goes to the step 1070 to check whether height adjustment is completed.

Figure 5:
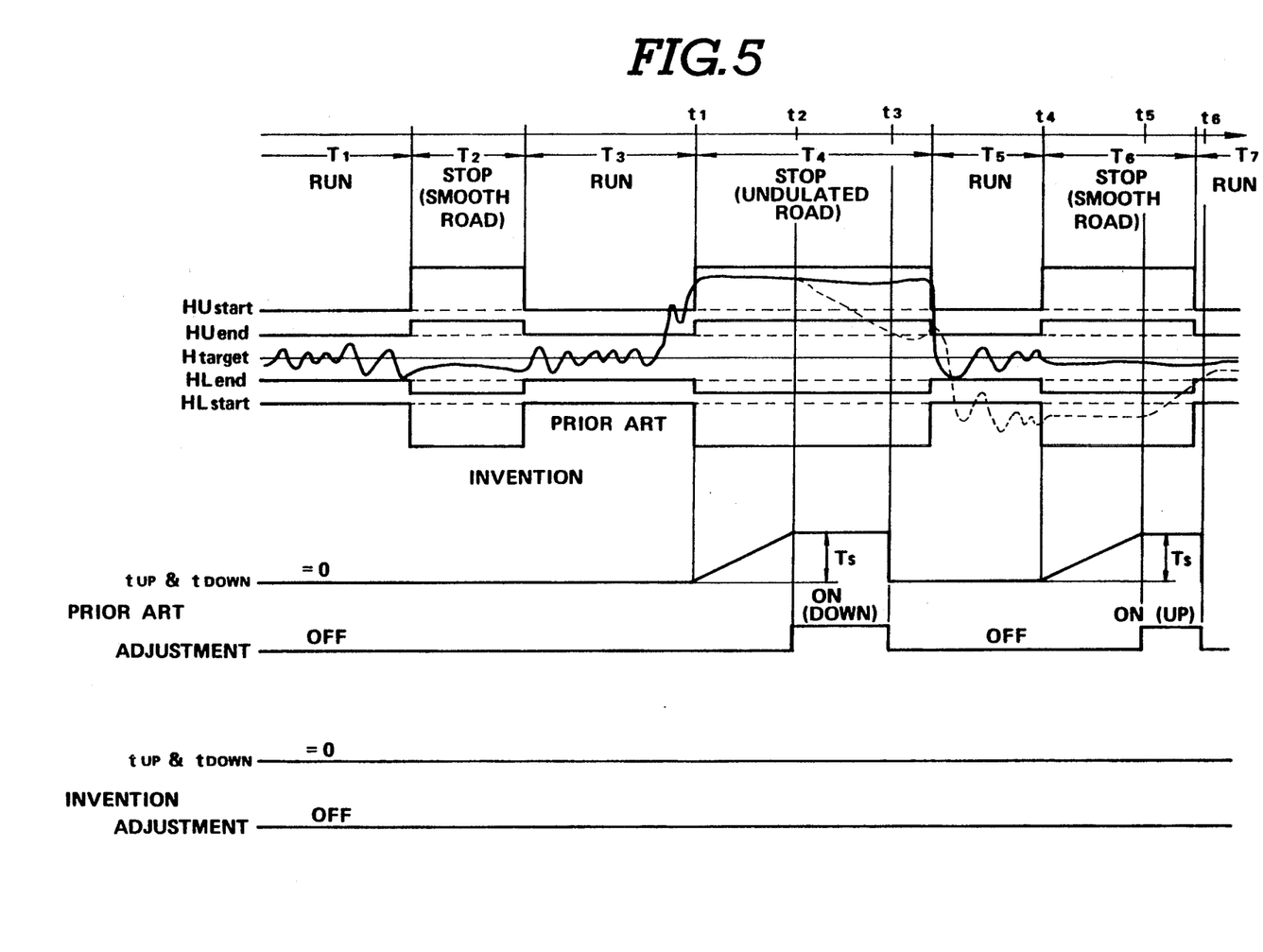
FIG. 5 is a timing chart showing operation of the height control to be performed by the preferred embodiment of the vehicular height control system according to the invention.

Practical operation of height adjustment in the preferred embodiment of the height control system, according to the invention, will be discussed with reference to FIG. 5 which shows a chart of vehicle driving condition when the vehicle travels a smooth road, stops at the smooth road, again travels to enter into undulated road, stopped at undulated road, gets out from the undulated road and entering into the smooth road, stops at the smooth road and again travels on the smooth road. In the shown chart, vehicle runs on the smooth road during a period $T_1$. At the end of the $T_1$ period, the vehicle stops on the smooth road. The vehicle stops on the smooth road during a period $T_2$. After the $T_2$ period, the vehicle again runs on the smooth road and thereafter get into the undulated road, during a period $T_3$. During a period $T_4$, the vehicle stops on the undulated road. After the $T_4$ period, the vehicle again runs to get out from the undulated road and to return into the smooth road, during the period $T_5$. Then, the vehicle stops on the smooth road during a period $T_6$. After the $T_6$ period, the vehicle resumes running on the smooth road in a period $T_7$. During the period $T_1$ through $T_7$, the vehicular height level and the height adjustment criteria $HU_{start}$, $HL_{start}$, $HU_{end}$ and $HL_{end}$ vary as shown by the solid line A, as controlled by the preferred embodiment of the height control system. By varying the height adjustment criteria $HU_{start}$, $HL_{start}$, $HU_{end}$ and $HL_{end}$ as shown, the vehicular height is held within the target height range throughout of travel. Therefore, no height adjustment is taken place as shown in (D).

This can be compared with the height control pattern possibly taken place by the height control system disclosed in the foregoing Japanese Patent First Publication No. 61-263818, which is illustrated by broken line. As will be seen from (B) and (C), since the height adjustment criteria $HU_{start}$, $HL_{start}$, $HU_{end}$ and $HL_{end}$ in the prior proposed system are held constant regardless of the vehicle driving condition, height adjustment is performed for once lowering the height and thereafter rising. Namely, in the shown example, the vehicular height becomes increased out of the adjustment start target height range due to undulation on the road surface. The vehicular height higher than the upper height adjustment start criterion $HU_{start}$ is detected at a time $t_1$. Since the $T_4$ period is longer than a fixed period of discrimination delay time Ts, downward height adjustment is taken place at during a period from a time $t_2$, at which the discrimination delay time Ts expires, to a time $t_3$. Therefore, the vehicle height is lowered. After returning to the smooth road, the vehicle height as lowered during the $T_4$ period becomes lower than the lower adjustment start criterion. This is detected at a time $t_4$. At a time $t_5$ at which the Ts period expires, upward height adjustment is performed. Upward height adjustment is terminated at a step $t_6$ at which the vehicular height is resumed within the adjustment terminating target height range.

As seen from this, the vehicular height control system according to the invention, successfully avoid unnecessary height adjustment and thus reduces frequency of occurence of height adjustment. This clearly improves riding comfort of the vehicle and expands the life of the compressor.

It should be appreciated that the height control to be performed by the microprocessor at the steps 1066, 1076, 1082, and 1086 incorporate various control parameters in addition to the vehicular height. Practical height control processes employing various height control parameters have been disclosed in the patents and co-pending applications, listed herebelow. The disclosure of the below-listed references are herein incorporated by reference.

U.S. Pat. No. 4,519,169
European Patent First publication 01 14 680
U.S. Pat. No. 4,659,104
U.S. Pat. No. 4,718,695
U.S. Ser. No. 906,239, filed on Sept. 12, 1986
U.S. Ser. No. 056,761, filed on Jun. 2, 1987
German patent First Publication 37 15 441
U.S. Ser. No. 120, 964, filed on Nov. 16, 1987

What is claimed is:

1. A height control system for a suspension control system for a vehicle, comprising:
a suspension system disposed between the body of the said vehicle and a suspension member rotably supporting a road wheel, said suspension system including means for varying a suspension force to be exerted between said body of said vehicle and said suspension member;

a first sensor for monitoring a height of said vehicle and for producing a height indicative first sensor signal;

a second sensor for monitoring a driving condition of said vehicle and for producing a driving condition indicative second sensor signal, said second sensor sensing a substantially stopped condition of said vehicle for producing said second sensor signal indicating thereof; and controlling means for receiving said first sensor signal and for comparing said first sensor signal with a predetermined first target height range for deriving a first control signal to operate said means for varying to adjust said suspension force for maintaining said height of said vehicle as represented by said first sensor signal within said predetermined first target height range while said second sensor signal is absent and for comparing said first sensor signal with a predetermined second target height range for deriving a second control signal to operate said means for varying to adjust said suspension force for maintaining said vehicular height as represented by said first sensor signal within said predetermined second target height range while said second sensor signal is present.

2. A vehicular height control system as set forth in claim 1, wherein said predetermined first target height range is used while height adjustment is in an inactive state and said predetermined second target height range is used while height adjustment is in an active state.

3. A vehicular height control system as set forth in claim 2, wherein said controlling means derives said predetermined first target height range on the basis of a predetermined target height and a first height deviation from said predetermined target height, and said second target height range on the basis of said predetermined target height and a second height deviation from said target height.

4. A vehicular height control system as set forth in claim 3, wherein said predetermined controlling means derives said first and second target height ranges by setting said predetermined target height as a center value thereof.

5. A vehicular height control system as set forth in claim 2, which further comprises timer means triggered in response to said first sensor signal indicative of said height of said vehicle out of said first target height range to measure a period of time in which said height of said vehicle is held out of said first target height range, and said controlling means is responsive to a timer value representative of a measured elapsed time greater than a given value to initiate height adjustment operation.

6. A vehicular height control system as set forth in claim 5, wherein said period of time is variable depending upon said driving condition as represented by said second sensor signal.

7. A vehicular height control system as set forth in claim 6, wherein said second sensor monitors a position of an ignition switch to discriminate an ignition switch position between a power supply position and a power block position to produce an ignition switch position indicative second sensor signal, and said period of time is variable depending upon said second sensor signal value.

8. A vehicular height control system as set forth in claim 6, wherein said second sensor monitors vehicle speed to produce a vehicle speed indicative second sensor signal and said period of time is variable depending upon said second sensor signal value.

9. A vehicular height control system as set forth in claim 6, wherein said second sensor monitors a road surface condition to produce a road surface condition indicative second sensor signal, and said period of time is variable depending upon said second sensor signal value.

10. A vehicular height control system as set forth in claim 6, wherein said second sensor is active while said vehicle is stopping to discriminate between a temporarily stopping condition and a parking condition of said vehicle to produce a vehicular stopping condition indicative second sensor signal having a value variable depending upon said temporarily stopping condition and said parking condition of said vehicle, and said period of time is variable depending upon said second sensor signal value.

11. A vehicular height control system as set froth in claim 10, wherein said second sensor monitors vehicle speed to produce a vehicle speed indicative second sensor signal and said second height is variable depending upon said second sensor signal value.

12. A vehicular height control system as set forth in claim 11, wherein said second sensor also monitors a road surface condition to produce a road surface condition indicative second sensor signal, and said second height is variable depending upon said second sensor signal value.

13. A vehicular height control system as set forth in claim 12, wherein said second sensor is active while said vehicle is stopping to discriminate between a temporarily stopping condition and a parking condition of said vehicle to produce a vehicular stopping condition indicative second sensor signal having a value variable depending upon said temporarily stopping condition and said parking condition of said vehicle, and said second height is variable depending upon said second sensor signal value.

14. A vehicular height control system as set forth in claim 13, wherein said second sensor monitors a position of an ignition switch to discriminate an ignition switch position between a power supply position and a power block position to produce an ignition switch position indicative second sensor signal, and said period of time is variable depending upon said second sensor signal value.

15. A vehicular height control system as set forth in claim 14, wherein said second sensor also monitors vehicle speed to produce a vehicle speed indicative second sensor signal and said period of time is variable depending upon said second sensor signal value.

16. A vehicular height control system as set forth in claim 15, wherein said second sensor further monitors a road surface condition to produce a road surface condition indicative second sensor signal, and said period of time is variable depending upon said second sensor signal value.

17. A vehicular height control system as set forth in claim 16, wherein said second sensor is also active while said vehicle is stopping to discriminate between a temporarily stopping condition and a parking condition of said vehicle to produce a vehicular stopping condition indicative second sensor signal having a value variable depending upon said temporarily stopping condition and said parking condition of said vehicle, and said period of time is variable depending upon second sensor signal value.

18. A vehicular height control system as set forth in claim 3, said first height deviation is set greater than said second height deviation.

19. A vehicular height control system as set forth in claim 18, wherein said second sensor monitors vehicle speed to produce a vehicle speed indicative second sensor signal and said first height is variable depending upon said second sensor signal value.

20. A vehicular height control system as set forth in claim 19, wherein said second sensor also monitors a road surface condition to produce a road surface condition indicative second sensor signal, and said first height is variable depending upon said second sensor signal value.

21. A vehicular height control system as set forth in claim 20, wherein said second sensor is further active while said vehicle is stopping to discriminate between a temporarily stopping condition and a parking condition of said vehicle to produce a vehicular stopping condition indicative second sensor signal having a value variable depending upon said temporarily stopping condition and said parking condition of said vehicle, and said first height is variable depending upon said second sensor signal value.

22. A vehicular height control system as set froth in claim 18, wherein said second sensor monitors vehicle speed to produce a vehicle speed indicative second sensor signal and said second height is variable depending upon said second sensor signal value.

23. A vehicular height control system as set forth in claim 22, wherein said second sensor also monitors a road surface condition to produce a road surface condition indicative second sensor signal, and said second height is variable depending upon said second sensor signal value.

24. A vehicular height control system as set forth in claim 23, wherein said second sensor is active while said vehicle is stopping to discriminate between a temporarily stopping condition and a parking condition of said vehicle to produce a vehicular stopping condition indicative second sensor signal having a value variable depending upon said temporarily stopping condition and said parking condition of said vehicle, and said second height is variable depending upon said second sensor signal value.

25. A vehicular height control system as set forth in claim 18, wherein said second sensor monitors a position of an ignition switch to discriminate said ignition switch position between a power supply position and a power block position to produce an ignition switch position indicative second sensor signal, and said period of time is variable depending upon said second sensor signal value.

26. A vehicular height control system as set froth in claim 25, wherein said second sensor also monitors vehicle speed to produce a vehicle speed indicative second sensor signal and said period of time is variable depending upon said second sensor signal value.

27. A vehicular height control system as set froth in claim 26, wherein said second sensor further monitors a road surface condition to produce a road surface condition indicative second sensor signal, and said period of time is variable depending upon said second sensor signal value.

28. A vehicular height control system as set forth in claim 27, wherein said second sensor is also active while said vehicle is stopping to discriminate between a temporarily stopping condition and a parking condition of said vehicle to produce a vehicular stopping condition indicating second sensor signal having a value variable depending upon said temporarily stopping condition and said parking condition of said vehicle, and said period of time is variable depending upon said second sensor signal value.

29. A vehicular height control system as set forth in claim 3, wherein said second sensor monitors vehicle speed to produce a vehicle speed indicative second sensor signal and said first height is variable depending upon said second sensor signal value.

30. A vehicular height control system as set forth in claim 3, wherein said second sensor monitors a road surface condition to produce a road surface condition indicative second sensor signal, and said first height is variable depending upon said second sensor signal value.

31. A vehicular height control system as set forth in claim 3, wherein said second sensor is active while said vehicle is stopping to discriminate between a temporarily stopping condition and a parking condition of said vehicle to produce a vehicular stopping condition indicative second sensor signal having a value variable depending upon said temporarily stopping condition and said parking condition of the said vehicle, and said first height is variable depending upon said second sensor signal value.

32. A vehicular height control system as set forth in claim 3, wherein said second sensor monitors vehicle speed to produce a vehicle speed indicative second sensor signal and said second height is variable depending upon said second sensor signal value.

33. A vehicular height control system as set forth in claim 3, wherein said second sensor monitors a road surface condition to produce a road surface condition indicative second sensor signal, and said second height is variable depending upon said second sensor signal value.

34. A vehicular height control system as set forth in claim 3, wherein said second sensor is active while said vehicle is stopping to discriminate between a temporarily stopping condition and a parking condition of said vehicle to produce a vehicular stopping condition indicative second sensor signal having a value variable depending upon said temporarily stopping condition and said parking condition of said vehicle, and said second height is variable depending upon said second sensor signal value.

35. A height control system for a suspension control system for a vehicle, comprising:
    a suspension system disposed between the body of said vehicle and a suspension member rotatably supporting a road wheel, said suspension system including means for varying a suspension force to be exerted between said body of said vehicle and said suspension member;
    a first sensor for monitoring a height of said vehicle and for producing a height indicative first sensor signal;
    a second sensor for monitoring a driving condition of said vehicle and for producing a driving condition indicative second sensor signal; and
    controlling means for receiving said first sensor signal and for comparing said first sensor signal with a predetermined first target height range which is set in relation to a first predetermined target height by setting a predetermined first deadband range thereabout, and for deriving a first control signal to operate said means for varying to adjust said suspension force for maintaining said height of said vehicle as represented by said first sensor signal within said predetermined first target height range while said second sensor signal is absent and for comparing said first sensor signal with a predetermined second target height range which is set in relation to a second predetermined target height by setting a predetermined second deadband range wider than said first deadband range and for deriving a second control signal to operate said means for varying to adjust said suspension force for maintaining said height of said vehicle within said second target height range while said second signal is present.

36. A vehicular height control system as set forth in claim 35, wherein controlling means derives said first upper and first lower criteria and second upper and second lower criteria by setting said predetermined target height as a center value thereof.

37. A vehicular height control system as set forth in claim 35, which further comprises timer means triggered in response to said first sensor signal indicative of said vehicular height out of said first target height range to measure a period of time in which said vehicular height is held out of said first target height range, and said controlling means is responsive to a timer value representative of a measured elapsed time greater than a given value to initiate a height adjustment operation.

38. A vehicular height control system as set forth in claim 37, wherein said period is variable depending upon said vehicle driving condition as represented by said second sensor signal.

39. A vehicular height control system as set forth in claim 38, wherein said second sensor monitors a position of an ignition switch to discriminate said ignition switch position between a power supply position and a power block position to produce an ignition switch position indicative second sensor signal, and said period of time is variable depending upon said second sensor signal value.

40. A vehicular height control system as set forth in claim 38, wherein said second sensor monitors vehicle speed to produce a vehicle speed indicative second sensor signal and said period of time is variable depending upon said second sensor signal value.

41. A vehicular height control system as set forth in claim 38, wherein said second sensor monitors a road surface condition to produce a road surface condition indicative second sensor signal, and said period of time is variable depending upon said second sensor signal value.

42. A vehicle height control system as set forth in claim 38, wherein said second sensor is active while said vehicle is stopping to discriminate between a temporarily stopping condition and a parking condition of said vehicle to produce a vehicular stopping condition indicative second sensor signal having a value variable depending upon said temporarily stopping condition and said parking condition of said vehicle, and said period of time is variable depending upon said second sensor signal value.

43. A vehicular height control system as set forth in claim 35, wherein a first height deviation is set greater than a second acceptable height deviation.

44. A vehicular height control system as set forth in claim 35, wherein said second sensor monitors vehicle speed to produce a vehicle speed indicative second sensor signal and said first height is variable depending upon said second sensor signal value.

45. A vehicular height control system as set forth in claim 35, wherein said second sensor monitors a road surface condition to produce a road surface condition indicative second sensor signal, and said first height is variable depending upon said second sensor signal value.

46. A vehicular height control system as set forth in claim 35, wherein said second sensor is active while said vehicle is stopping to discriminate between a temporarily stopping condition and a parking condition of said vehicle to produce a vehicular stopping condition indicative second sensor signal having a value variable depending upon said temporarily stopping condition and said parking condition of said vehicle, and said first height is variable depending upon said second sensor signal value.

47. A vehicular height control system as set forth in claim 35, wherein said second sensor monitors vehicle speed to produce a vehicle speed indicative second sensor signal and said second height is variable depending upon said second sensor signal value.

48. A vehicular height control system as set forth in claim 35, wherein said second sensor monitors a road surface condition to produce a road surface condition indicative second sensor signal, and said second height is variable depending upon said second sensor signal value.

49. A vehicular height control system as set forth in claim 35, wherein said second sensor is active while said vehicle is stopping to discriminate between a temporarily stopping condition and a parking condition of said vehicle to produce a vehicular stopping condition indicative second sensor signal having a value variable depending upon said temporarily stopping condition and said parking condition of said vehicle, and said second height is variable depending upon said second sensor signal value.

50. A height control system for a suspension control system for a vehicle, comprising:
 a suspension system disposed between the body of said vehicle and a suspension member rotatably supporting a road wheel, said suspension system including means for varying a suspension force to be exerted between said body of said vehicle and said suspension member;
 a first sensor for monitoring a height of said vehicle and for producing a height indicative first sensor signal;
 a second sensor for monitoring a driving condition of said vehicle and for producing a driving condition indicative second sensor signal, said second sensor sensing a substantially stopped condition of said vehicle for producing said second sensor signal indicative thereof; and
 controlling means for receiving said first sensor signal and for comparing said first signal with a predetermined first target height range for deriving a first control signal to operate said means for varying to adjust said suspension force for maintaining said height of said vehicle as represented by said first sensor signal within said predetermined first target height range while said second sensor signal is absent and for comparing said first sensor signal with a predetermined second target height range for deriving a second control signal to operate said means for varying to adjust said suspension force for maintaining said height of said vehicle as represented by said first sensor signal within said predetermined second target height range while said second sensor signal is present, said predetermined first target range being defined by a first criteria representing height levels of said vehicle in order to start height adjustment by operating said means for varying when said height of said vehicle represented by said first sensor signal is varying out of said predetermined first target height range across said first criteria, and by a second criteria representing height levels of said vehicle in order to terminate height adjustment by terminating operation of said means for varying when said height of said vehicle represented by said first sensor signal is varying into said predetermined first target height range across said second criteria, said predetermined second target height range being defined by third criteria representing height levels of said vehicle in order to start height adjustment by operating said means for varying when said height of said vehicle represented by said first sensor signal is varying out of said predetermined second target height range across said third criteria, and by fourth criteria different from said third criteria, said fourth criteria representing height levels to terminate said height adjustment by terminating operation of said means for varying when said height of said vehicle is varying into said predetermined second target height range across said second criterion.

* * * * *